(12) United States Patent
Matsuo et al.

(10) Patent No.: US 11,230,039 B2
(45) Date of Patent: Jan. 25, 2022

(54) METHOD FOR INSERT-MOLDING FILM MATERIAL

(71) Applicant: MAZDA MOTOR CORPORATION, Hiroshima (JP)

(72) Inventors: Takayuki Matsuo, Hiroshima (JP); Takeshi Yamada, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 453 days.

(21) Appl. No.: 16/088,020

(22) PCT Filed: Mar. 15, 2017

(86) PCT No.: PCT/JP2017/010504
§ 371 (c)(1),
(2) Date: Sep. 24, 2018

(87) PCT Pub. No.: WO2018/061250
PCT Pub. Date: Apr. 5, 2018

(65) Prior Publication Data
US 2019/0111599 A1    Apr. 18, 2019

(30) Foreign Application Priority Data

Sep. 29, 2016   (JP) .............................. JP2016-191664

(51) Int. Cl.
*B29C 45/16*   (2006.01)
*B29C 45/14*   (2006.01)
(Continued)

(52) U.S. Cl.
CPC ...... *B29C 45/1671* (2013.01); *B29C 45/0001* (2013.01); *B29C 45/14008* (2013.01);
(Continued)

(58) Field of Classification Search
None
See application file for complete search history.

(56) References Cited

U.S. PATENT DOCUMENTS 4,642,209 A * 2/1987 Powell .................... B29C 33/14
249/96
5,053,178 A * 10/1991 Butlin .................... B26B 21/06
264/254

(Continued)

FOREIGN PATENT DOCUMENTS

CN    101774252 A    7/2010
CN    101804684 A    8/2010
(Continued)

OTHER PUBLICATIONS

International Search Report issued in PCT/JP2017/010504; dated Apr. 15, 2017.

*Primary Examiner* — Edmund H Lee
(74) *Attorney, Agent, or Firm* — Studebaker & Brackett PC

(57) ABSTRACT

A film material insert molding method, includes an intermediate part forming step of forming a first intermediate part having an edge extending radially outward, the edge being disposed at and near an outer peripheral end of a final shape of a film material, a transparent resin layer forming step of forming a second intermediate part including a transparent resin layer, by injection molding, on a front surface of the first intermediate part, with the edge of the first intermediate part being fixed, and a substrate resin layer forming step of forming an insert-molded article including a substrate resin layer, by injection molding, on a back surface of the second intermediate part, the substrate resin layer covering a surface of a radially outer end of the edge.

16 Claims, 17 Drawing Sheets

(51) Int. Cl.
*B29C 45/00* (2006.01)
*B29C 45/27* (2006.01)
*B29C 45/37* (2006.01)
*B60R 13/00* (2006.01)
B29K 55/02 (2006.01)
B29L 31/30 (2006.01)
B29K 69/00 (2006.01)

(52) U.S. Cl.
CPC .. *B29C 45/14221* (2013.01); *B29C 45/14262* (2013.01); *B29C 45/14778* (2013.01); *B29C 45/162* (2013.01); *B29C 45/1643* (2013.01); *B29C 45/27* (2013.01); *B29C 45/37* (2013.01); *B60R 13/005* (2013.01); B29C 45/1615 (2013.01); B29C 2045/1427 (2013.01); B29C 2045/14245 (2013.01); B29C 2045/1617 (2013.01); B29C 2045/1621 (2013.01); B29C 2045/378 (2013.01); B29K 2055/02 (2013.01); B29K 2069/00 (2013.01); B29K 2995/003 (2013.01); B29K 2995/0026 (2013.01); B29K 2995/0027 (2013.01); B29K 2995/0097 (2013.01); B29L 2031/3005 (2013.01)

(56) References Cited

U.S. PATENT DOCUMENTS

| | | | | |
|---|---|---|---|---|
| 5,338,592 A | * | 8/1994 | Ohsumi | B29C 45/1671 428/106 |
| 5,525,179 A | * | 6/1996 | Stickling | B29C 45/1671 156/245 |
| 6,875,301 B2 | * | 4/2005 | Kauppi | B29C 45/14688 156/245 |
| 7,643,072 B2 | * | 1/2010 | Ashida | H04N 9/0455 348/243 |
| 7,704,427 B2 | * | 4/2010 | Fujii | B29C 45/1671 264/254 |
| 2002/0048667 A1 | * | 4/2002 | Kauppi | B29C 45/14688 428/209 |
| 2004/0125023 A1 | * | 7/2004 | Fujii | H01Q 1/3291 343/700 MS |
| 2005/0237261 A1 | | 10/2005 | Fujii et al. | |
| 2008/0309579 A1 | | 12/2008 | Maeda et al. | |
| 2009/0022957 A1 | | 1/2009 | Aso et al. | |
| 2011/0273356 A1 | * | 11/2011 | Kawaguchi | C23C 14/35 343/873 |
| 2013/0034693 A1 | | 2/2013 | Fujii et al. | |
| 2015/0224748 A1 | | 8/2015 | Onishi et al. | |
| 2016/0261034 A1 | * | 9/2016 | Geise | B29C 45/1671 |

FOREIGN PATENT DOCUMENTS

| | | |
|---|---|---|
| CN | 102431120 A | 5/2012 |
| CN | 102910022 A | 2/2013 |
| CN | 104718079 A | 6/2015 |
| EP | 1219401 A2 | 7/2002 |
| EP | 1902902 A1 | 3/2008 |
| JP | 2004-251868 A | 9/2004 |
| JP | 2007-296848 A | 11/2007 |
| JP | 2009-018790 A | 1/2009 |
| JP | 2010-099870 A | 5/2010 |
| JP | 2010-111010 A | 5/2010 |
| JP | 2016-141355 A | 8/2016 |
| JP | 2016-150497 A | 8/2016 |

\* cited by examiner

3a: RECEPTION SURFACE PORTION

METHOD FOR INSERT-MOLDING FILM MATERIAL

TECHNICAL FIELD

The present invention relates to a film material insert molding method and device for forming a transparent resin layer on a front surface of a film material having a design portion and a substrate resin layer on a back surface of the film material.

BACKGROUND ART

In order to improve the decorativeness of resin molded articles, such as interior and exterior parts of vehicles and home appliances, a film material having a design portion has conventionally been attached to and integrated with a transparent resin layer or a substrate resin layer using an insert molding process, which is a common practice.

A film material is attached to a substrate resin layer, etc., as follows, for example. A film material that is decorated (preliminarily shaped) in a design portion thereof to have a graphic pattern or a raised and recessed pattern is placed in the cavity of an injection molding die. Thereafter, a molten resin material for a substrate resin layer, etc., is injected into the cavity, so that the film material and the substrate resin layer, etc., are joined together by thermal fusion.

A radiowave radar device (e.g., a millimeter wave radar device, etc.) has in recent years been mounted behind a radiator grille in order to, for example, measure a distance to a vehicle or obstacle in front, and thereby assist a driver in driving the vehicle.

An emblem, which is an exterior part having a design portion, is fixed to a center of a radiator grille at a front end of a vehicle body, and therefore, is located in the traveling path of radar waves emitted by the radiowave radar device. With this in mind, a method for producing an emblem (automotive radiowave-transparent cover) that allows radar waves to pass through has been proposed.

PATENT DOCUMENT 1 describes a method for producing an automotive radiowave-transparent cover, including a shaping step of shaping a film material having a vapor-deposited metal film so that the film material has a design portion having a raised and recessed pattern, a decorated part forming step of forming a decorated part by shaping the film material into a final external shape, a transparent resin layer forming step of forming a transparent resin layer on a front surface of the decorated part by an injection process, and a substrate resin layer forming step of forming a substrate resin layer on a back surface of the decorated part by an injection process.

This method can be used to produce an emblem having a three-layer structure including a film material, a transparent resin layer, and a substrate resin layer.

CITATION LIST

Patent Document

PATENT DOCUMENT 1: Japanese Patent Application No. 2010-111010

SUMMARY OF THE INVENTION

Technical Problem

In the production method for an automotive radiowave-transparent cover of PATENT DOCUMENT 1, after the transparent resin layer and the substrate resin layer have been successively formed on the front and back surfaces of the film material by injection molding, it is not necessary to include the step of shaping (cutting) or trimming the entire product into an external shape of the final product. Therefore, the production process can be simplified.

Although, in the technology of PATENT DOCUMENT 1, it is not necessary to trim the external shape after the substrate resin layer forming step, which is the final step, and therefore, the production process can advantageously be simplified, it is likely that the external appearance of the final product (insert-molded article) after the substrate resin layer forming step cannot be sufficiently improved as described below.

Firstly, wrinkles are likely to occur in the film material having a design portion.

After the end of the transparent resin layer forming step, the molten resin remaining the gate solidifies to form a gate resin solid. When the gate resin solid is removed, a removal mark may be left. To avoid the occurrence of such a removal mark on the design surface, a side-gate type die in which the gate is disposed at a lateral position of the cavity and a molten resin material is injected into the cavity laterally with respect to the cavity, trends to be employed.

In this case, the molten transparent resin material flows in the side gate in a direction parallel to the surface of the film material. The flowing molten transparent resin material applies a flow pressure to the film material placed in the die in the shear direction, which causes the film material to be displaced from a predetermined position.

Secondly, an end of the film material is likely to be exposed from an external peripheral side surface of the final product.

The transparent resin layer and the substrate resin layer are formed on the front and back surfaces, respectively, of the film material by injection molding with the film material being interposed therebetween.

Therefore, an end of the film material on which a design portion is not formed is visually noticeable between the transparent resin layer and the substrate resin layer at an external peripheral side surface of the final product.

As described above, there is room for improvement in the external appearance of the final product.

It is an object of the present invention to provide a film material insert method and device that can simplify a production process, and improve the external appearance of a final product, etc.

Solution to the Problem

The invention as in claim 1 is a film material insert molding method for forming a transparent resin layer on a front surface of a film material having a design portion and a substrate resin layer on a back surface of the film material, the method including: an intermediate part forming step of forming a first intermediate part having an edge extending radially outward, the edge being disposed at and near an outer peripheral end of a final shape of the film material; a transparent resin layer forming step of forming a second intermediate part including a transparent resin layer, by injection molding, on a front surface of the first intermediate part, with the edge of the first intermediate part being fixed; and a substrate resin layer forming step of forming an insert-molded article including a substrate resin layer, by injection molding, on a back surface of the second intermediate part, the substrate resin layer covering a surface of a radially outer end of the edge.

With this configuration, the insert molding method includes the intermediate part forming step of forming the first intermediate part having the edge extending radially at and near an outer peripheral end of a final shape of the film material, and the transparent resin layer forming step of forming the second intermediate part including the transparent resin layer, by injection molding, on the front surface of the first intermediate part with the edge being fixed. Therefore, in the transparent resin layer forming step, the edge of the film material can be fixed to a first and a second die, and therefore, the film material can be prevented from being displaced due to a flow pressure of a molten transparent resin material flowing through a gate, and therefore, wrinkles are prevented from occurring in the film material.

The insert molding method includes the substrate resin layer forming step of forming the insert-molded article including the substrate resin layer covering the surface of the radially outer end of the edge, by injection molding, on the back surface of the second intermediate part. Therefore, an end of the film material can be prevented from being exposed from an external peripheral side surface of the insert-molded article as a final product, and thereby prevented from being visually noticeable.

The invention as in claim 2 is the invention as in claim 1 in which the intermediate part forming step includes forming one or more recessed portions that are radially inwardly hollow, in the edge, and the transparent resin layer forming step includes positioning the first intermediate part using the one or more recessed portions.

With this configuration, the accuracy of positioning the first intermediate part in the transparent resin layer forming step can be improved.

The invention a in claim 3 is the invention as in claim 1 or 2 in which the transparent resin layer forming step includes forming a reception surface portion that allows a locating pin to position the first intermediate part and is radially inwardly hollow and located at a position of the transparent resin layer corresponding to the locating pin, and the substrate resin layer forming step including forming the substrate resin layer such that the substrate resin layer covers the reception surface portion.

With this configuration, the accuracy of positioning the first intermediate part and the improvement of external appearance can be simultaneously achieved.

The invention as in claim 4 is the invention as in any one of claims 1-3 in which the intermediate part forming step includes forming a plurality of radially extending cuts in the edge.

With this configuration, even if the edge is elongated in order to enhance the fixation of the first intermediate part by a die, the occurrence of wrinkles in the first intermediate part can be prevented or reduced.

The invention as in claim 5 is the invention as in any one of claims 1-4 in which the intermediate part forming step including forming a protruding and recessed pattern in the design portion, and the substrate resin layer forming step includes forming the substrate resin layer such that the insert-molded article has a uniform thickness.

With this configuration, the transmission of radio waves can be ensured while impression of depth is provided.

The invention as in claim 6 is a film material insert molding device for forming a transparent resin layer on a front surface of a film material having a design portion and a substrate resin layer on a back surface of the film material, the device including: a transparent resin layer forming unit configured to form a second intermediate part including a transparent resin layer, by injection molding, on a front surface of a first intermediate part having an edge extending radially outward, the edge being disposed at and near an outer peripheral end of a final shape of the film material, with the edge of the first intermediate part being fixed; and a substrate resin layer forming unit configured to form an insert-molded article including a substrate resin layer, by injection molding, on a back surface of the second intermediate part, the substrate resin layer covering a surface of a radially outer end of the edge.

With this configuration, the insert molding device includes the transparent resin layer forming unit configured to form the second intermediate part including the transparent resin layer, by injection molding, on the front surface of the first intermediate part having the edge extending radially outward, the edge being disposed at and near the outer peripheral end of the final shape of the film material, with the edge of the first intermediate part being fixed. Therefore, the edge of the film material can be fixed in the transparent resin layer forming step, and therefore, the film material can be prevented from being displaced due to a flow pressure of a molten transparent resin material flowing through a gate, and therefore, wrinkles are prevented from occurring in the film material. The insert molding device includes the substrate resin layer forming unit configured to form an insert-molded article including the substrate resin layer, by injection molding, on the back surface of the second intermediate part, the substrate resin layer covering the surface of the radially outer end of the edge. Therefore, an end of the film material can be prevented from being exposed from an external peripheral side surface of the insert-molded article as a final product, and thereby prevented from being visually noticeable.

The invention as in claim 7 is the invention as in claim 6 in which the transparent resin layer forming unit includes a positioning mechanism configured to position the first intermediate part using one or more recessed portions that are formed in the edge and are radially inwardly hollow.

With this configuration, the accuracy of positioning the first intermediate part in the transparent resin layer forming step can be improved.

Advantages of the Invention

According to the film material insert molding method and device of the present invention, the external appearance of a final product can be improved while a production process is simplified.

DESCRIPTION OF EMBODIMENTS

Embodiments of the present invention will now be described in detail with reference to the accompanying drawings.

In the description that follows, embodiments of a method and device for molding a vehicle emblem according to the present invention are illustrated, and are in no way intended to limit the present invention, application, and uses.

Example 1

Example 1 of the present invention will now be described with reference to FIGS. 1-15.

Firstly, a vehicle to which an emblem 1 (insert-molded article) is attached will be described.

The vehicle is equipped with a millimeter wave radar (not shown) which is disposed behind a radiator grille, i.e., facing a back surface of the radiator grille.

The millimeter wave radar is configured to use millimeter waves having a frequency of 30-300 GHz and a wavelength of 1-10 mm, and measure a vehicle-to-vehicle distance or relative velocity between an object (e.g., a vehicle in front, etc.) and the host vehicle, based on a difference between the millimeter waves emitted from the host vehicle and the received waves reflected by the object. A driver assistance system, such as an automatic cruise control system, is operated using the detected value.

If a wall portion disposed in front of the millimeter wave radar has a non-uniform wall thickness, the transmission speed of millimeter waves differs between a thick wall portion and a thin wall portion, resulting in variations in the detected value, which leads to a reduction in control accuracy. With this in mind, in this example, the millimeter wave radar is disposed at a position that allows the emblem 1 configured to have a uniform thickness to be located in the traveling path of millimeter waves of the radar.

Next, the emblem 1 as a final product will be described.

Figure 1:
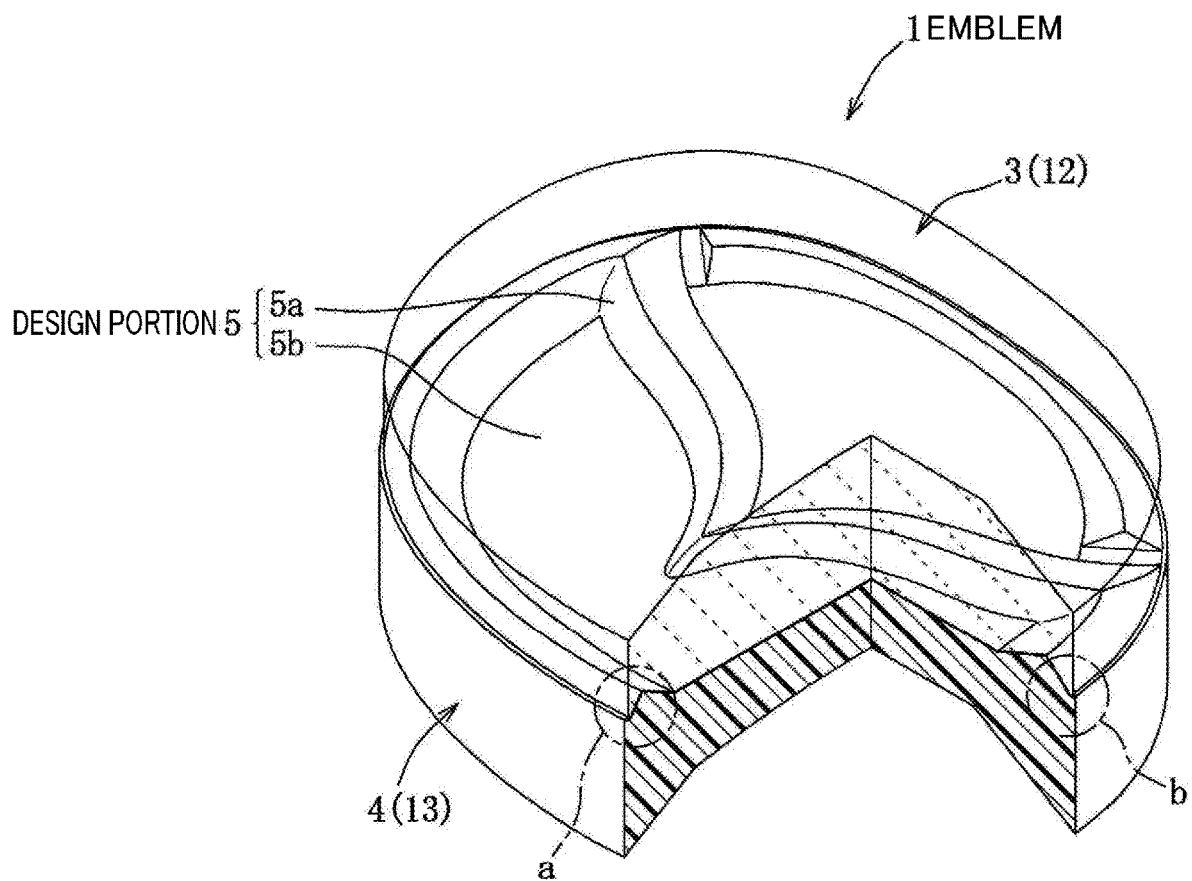
FIG. 1 is a partial vertical cross-sectional perspective view of a vehicle emblem that is produced using a film material insert molding method according to Example 1.

As shown in FIG. 1, the emblem 1 includes a first intermediate part 2 that has a design portion, a transparent resin layer 3 that is formed on a front surface of the first intermediate part 2, a substrate resin layer 4 that is formed on a back surface of the first intermediate part 2, etc. The emblem 1 has a uniform thickness that is an integer multiple of half the wavelength of millimeter waves emitted by the millimeter wave radar.

The first intermediate part 2 is formed of a film material 11 (e.g. PICASUS (registered trademark), manufactured by Toray Industries, Inc.) that has wavelength selectivity to control transmission and reflection of light according to wavelength, and has a reflectance of 90% or more with respect to radar radiation, and does not contain a heavy metal.

The first intermediate part 2 includes a design portion 5 including a shape portion 5a and a background portion 5b formed around the shape portion 5a. The shape portion 5a, which has a predetermined symbol shape with metallic gloss (e.g. a silver color, etc.) and an elliptical shape surrounding the symbol shape, is raised from the background portion 5b in the front direction. The background portion 5b is designed to have a black color in a region excluding the shape portion 5a.

As shown in FIG. 1, the front surface of the first intermediate part 2 is uniformly covered by the transparent resin layer 3. As a result, the impression of depth can occur with respect to the design portion 5, resulting in an increase in the design properties of the emblem 1.

The transparent resin layer 3 is formed of a transparent resin material 12 (e.g. a polycarbonate (PC)) containing an amorphous synthetic resin. The transparent resin material 12 has a molecular chain. When the transparent resin material 12 is cooled and transforms from a liquid (molten state) to a solid, the molecules of the transparent resin material 12 cannot form a regular arrangement. Therefore, the transparent resin material 12 has characteristics that the mechanical strength sharply decreases when the temperature exceeds the glass transition temperature Tg.

The transparent resin material 12 in the solid state also has a random arrangement, and therefore, the expansion or shrinkage, i.e., a change in volume, of the transparent resin material 12 due to heating or cooling tends to be mild compared to crystalline synthetic resins (e.g. polyethylene (PE), polypropylene (PP), etc.).

In this example, a front surface of the transparent resin layer 3, which is exposed to the outside, is uniformly covered by a hard coat layer having an ultraviolet light blocking effect.

In the description that follows, an intermediate part structure that includes the first intermediate part 2 and the transparent resin layer 3 formed on the front surface of the first intermediate part 2, is referred to as a "second intermediate part 6," for the sake of convenience.

Figure 2A:
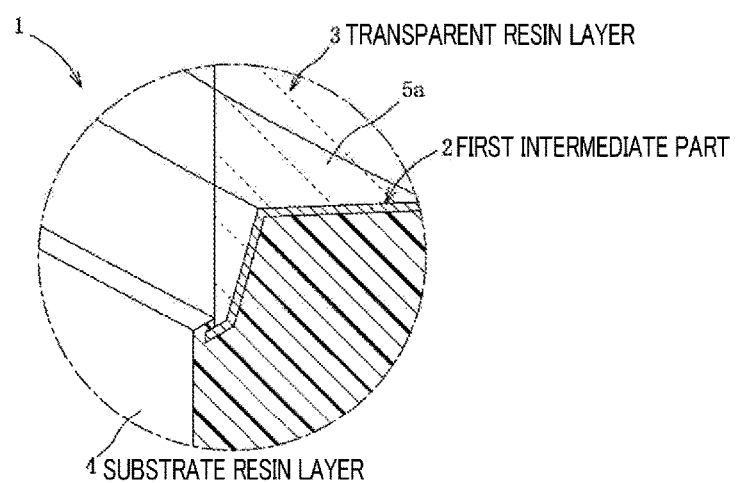
FIG. 2A is an enlarged view of a main portion of FIG. 1, i.e., an enlarged view of a region "a."
Figure 2B:
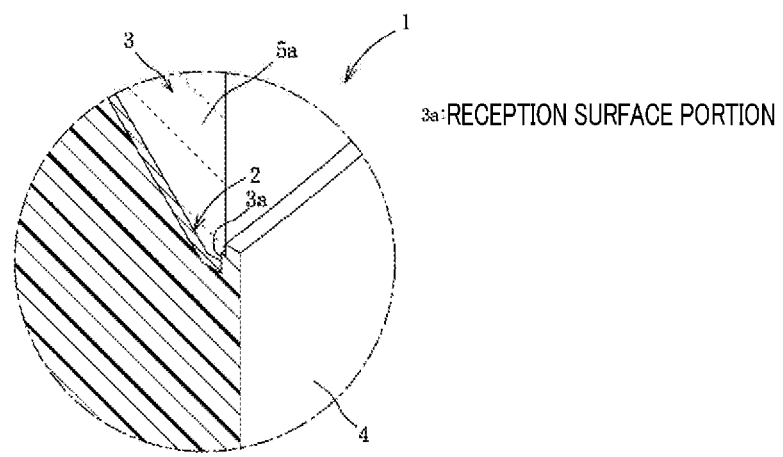
FIG. 2B is an enlarged view of a main portion of FIG. 1, i.e., an enlarged view of a region "b."

As shown in FIGS. 1, 2A, and 2B, the back surface of the first intermediate part 2 (the second intermediate part 6), and an outer peripheral portion at a radially outer end of the first intermediate part 2, are uniformly covered by the substrate resin layer 4, which has a color (e.g., black, etc.). As a result, the stiffness of the emblem 1 is ensured, and in addition, the external appearance of the emblem 1 is improved.

The substrate resin layer 4 is formed of a substrate resin material 13 containing an amorphous synthetic resin (e.g. an acrylonitrile-butadiene-styrene copolymer (ABS)). The substrate resin material 13 has a glass transition temperature that is lower than the glass transition temperature Tg (145° C.) of the transparent resin material 12.

Note that the substrate resin material 13 may be formed of any of a polycarbonate, a polycarbonate/ABS (PC/ABS), and a polycarbonate/PBT (PC/PBT), instead of an ABS.

Next, a molding method for the emblem 1 will be described.

In the description that follows, an insert molding device is also described.

Figure 3:
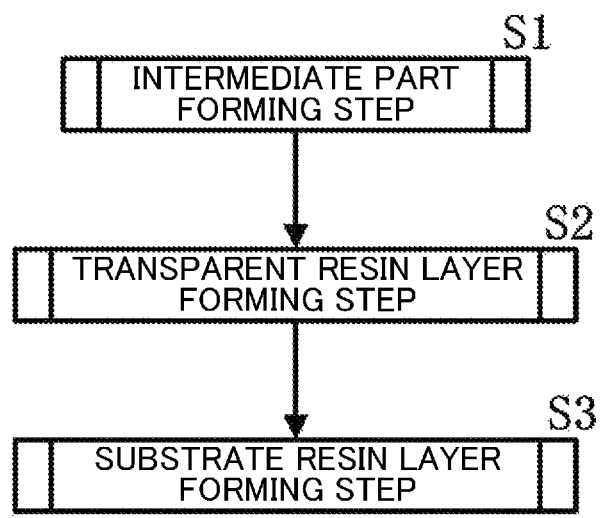
FIG. 3 is a flowchart of a film material insert molding method.

As shown in FIG. 3, an insert molding procedure for the emblem 1 includes: an intermediate part forming step S1 of forming the first intermediate part 2 including an edge 2a that is disposed at and near an outer peripheral end of a final shape of the film material 11, extending radially outward (see FIG. 7); a transparent resin layer forming step S2 of forming the second intermediate part 6 including the transparent resin layer 3 by injection molding using a first and a second die 31 and 32 on the front surface of the first intermediate part 2 with the edge 2a being fixed to the first and second dies 31 and 32; and a substrate resin layer forming step S3 of forming an insert-molded article including the substrate resin layer 4 covering the radially outer end of the edge 2a on the back surface of the second intermediate part 6 by injection molding, the insert molding article being the emblem 1.

Firstly, the intermediate part forming step S1 will be described in greater detail.

Figure 4:
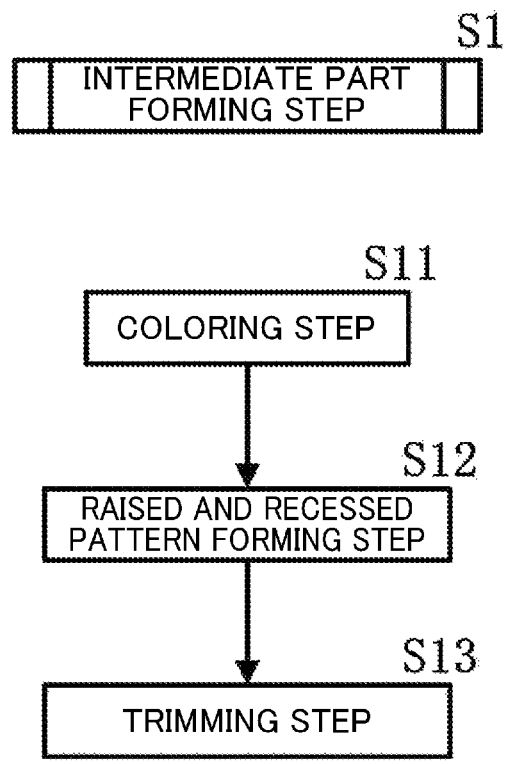
FIG. 4 is a flowchart of an intermediate part forming step.

As shown in FIG. 4, the intermediate part forming step S1 includes: a coloring step S11 of continually performing screen printing on each of the front and back surfaces of the film material 11 which is in the shape of a long band, which step is involved in the formation of the design portion 5; a raised and recessed pattern forming step S12 of forming a raised and recessed pattern (raised and recessed design) of the shape portion 5a of the design portion 5; and a trimming step S13 of trimming the long-band film material 11 to remove unnecessary portions thereof into a final external shape, and thereby forming the final shape (the first intermediate part 2) of the film material 11 corresponding to the emblem 1.

Figure 5:
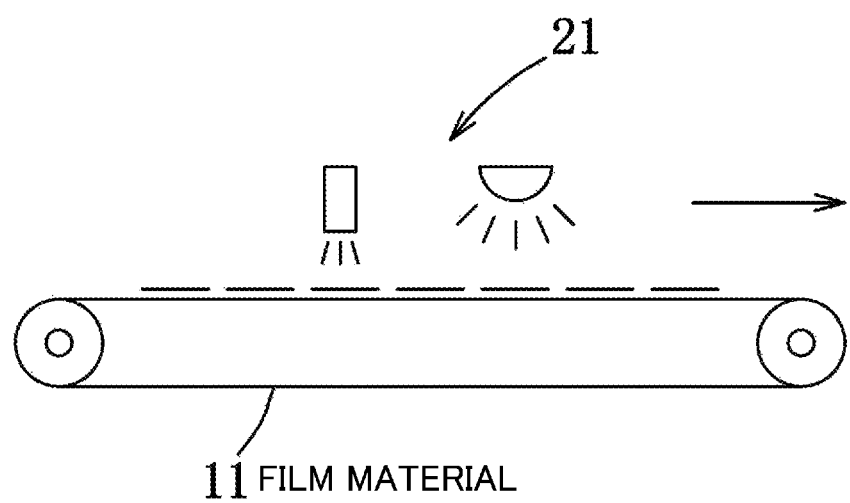
FIG. 5 is a diagram showing a coloring step.

As shown in FIG. 5, in the coloring step S11, printing is continually performed on each of the front and back surfaces of the long-band film material 11 moving in a direction indicated by an arrow, using a coloring device 21.

The coloring device 21 performs a masking process corresponding to the shape of the shape portion 5a on the front surface of the film material 11, and transfers a black coating material to an unmasked region (the background portion 5b) of the front surface of the film material 11 after the masking process, removes the mask, and dries the film material 11, in the first turn, and transfers a gray coating material to the back surface of the film material 11, and dries the film material 11, in the second turn.

As a result, a plurality of the design portions 5 having the shape portion 5a on which a raised and recessed pattern has not yet been formed, and the background portion 5b, are successively printed on the long-band film material 11.

In the raised and recessed pattern forming step S12, a raised and recessed pattern is formed using pressure forming dies 22 and 23 at a position corresponding to the shape portion 5a of the long-band film material 11.

Figure 6A:
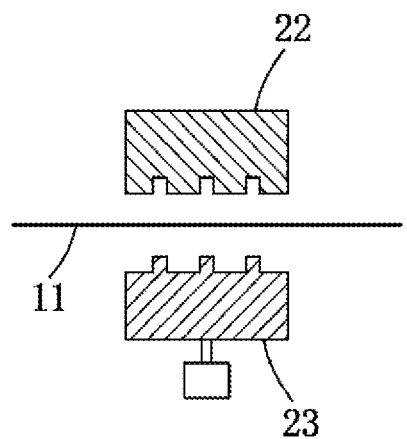
FIG. 6A is a diagram showing a raised and recessed pattern forming step.
Figure 6B:
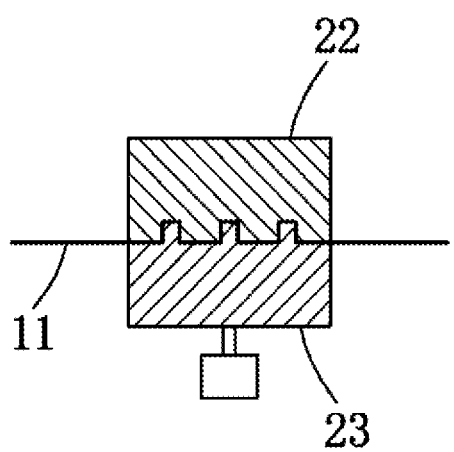
FIG. 6B is a diagram showing the raised and recessed pattern forming step.

As shown in FIGS. 6A and 6B, after being disposed at a predetermined position and softened by heating, the film material 11 is sandwiched by the pressure forming dies 22 and 23 performing a closing operation. A space between the die 22 and the film material 11 is vacuumed while compression air is supplied from the die 23, so that the pressure of the compressed air causes the film material 11 to tightly stick to the die 22. As a result, a raised and recessed pattern is formed.

As a result, the raised and recessed design having a height difference of about 5 mm is formed at a position corresponding the shape portion 5a of the film material 11, i.e., a so-called center symbol and an elliptical portion surrounding the symbol.

The raised and recessed pattern may be formed by vacuum forming instead of pressure forming.

In the trimming step S13, the first intermediate part 2 is formed of the film material 11 using a trimming device (not shown).

Figure 7:
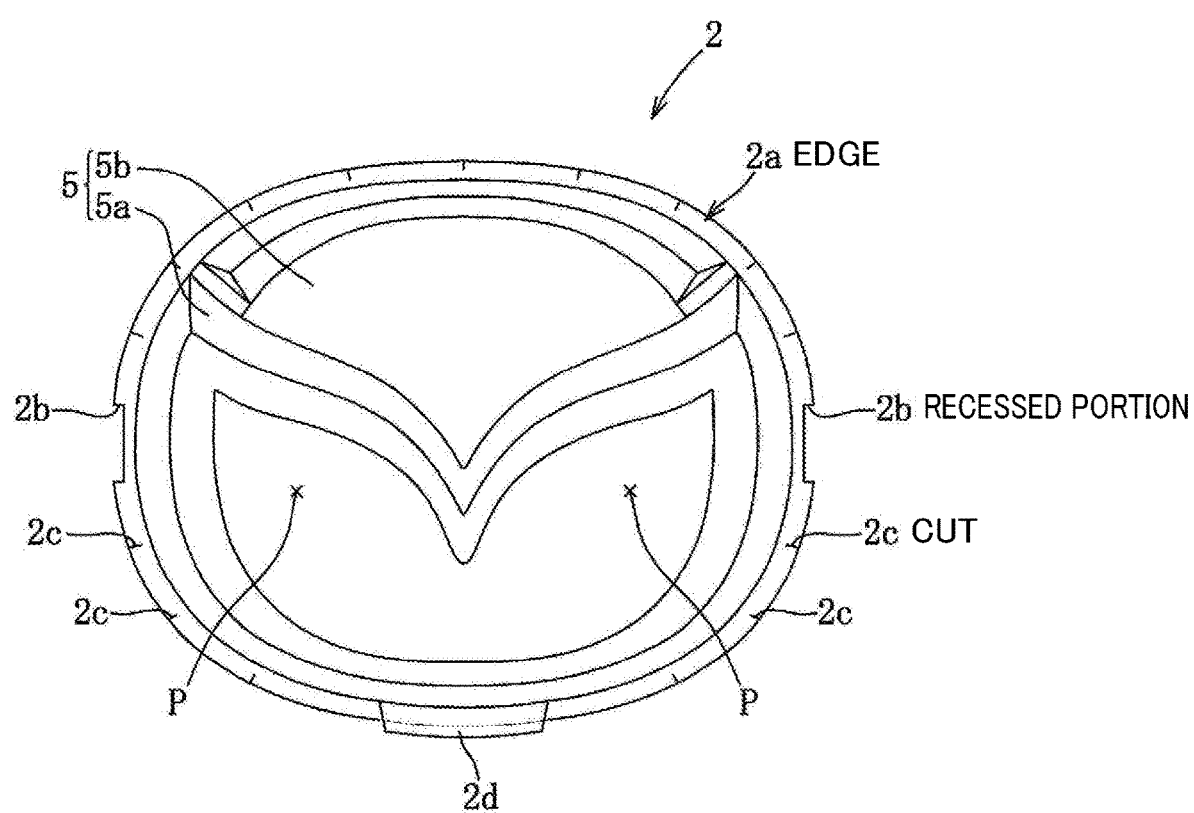
FIG. 7 is a front view of a first intermediate part.

As shown in FIG. 7, the first intermediate part 2 is formed into substantially an elliptical shape as viewed from the front so that the first intermediate part 2 includes the design portion 5 having the shape portion 5a and the background portion 5b and corresponds to the emblem 1. The first intermediate part 2 includes the edge 2a that is disposed at and near the outer peripheral end, slightly extending radially outward.

The edge 2a has a radial width that allows the edge 2a to slightly remain in the transparent resin layer forming step S2.

The edge 2a is uniformly formed along the entire perimeter of the first intermediate part 2.

The edge 2a includes a pair of substantially rectangular recessed portions 2b that are radially inwardly hollow at both ends in the major axis length thereof, and a plurality of cuts 2c distributed along the entire perimeter thereof and extending radially.

The edge 2a also includes an extension 2d at a portion thereof corresponding to a runner 38b described below. The extension 2d extends radially outward from a radially outer end of the edge 2a.

Figure 11:
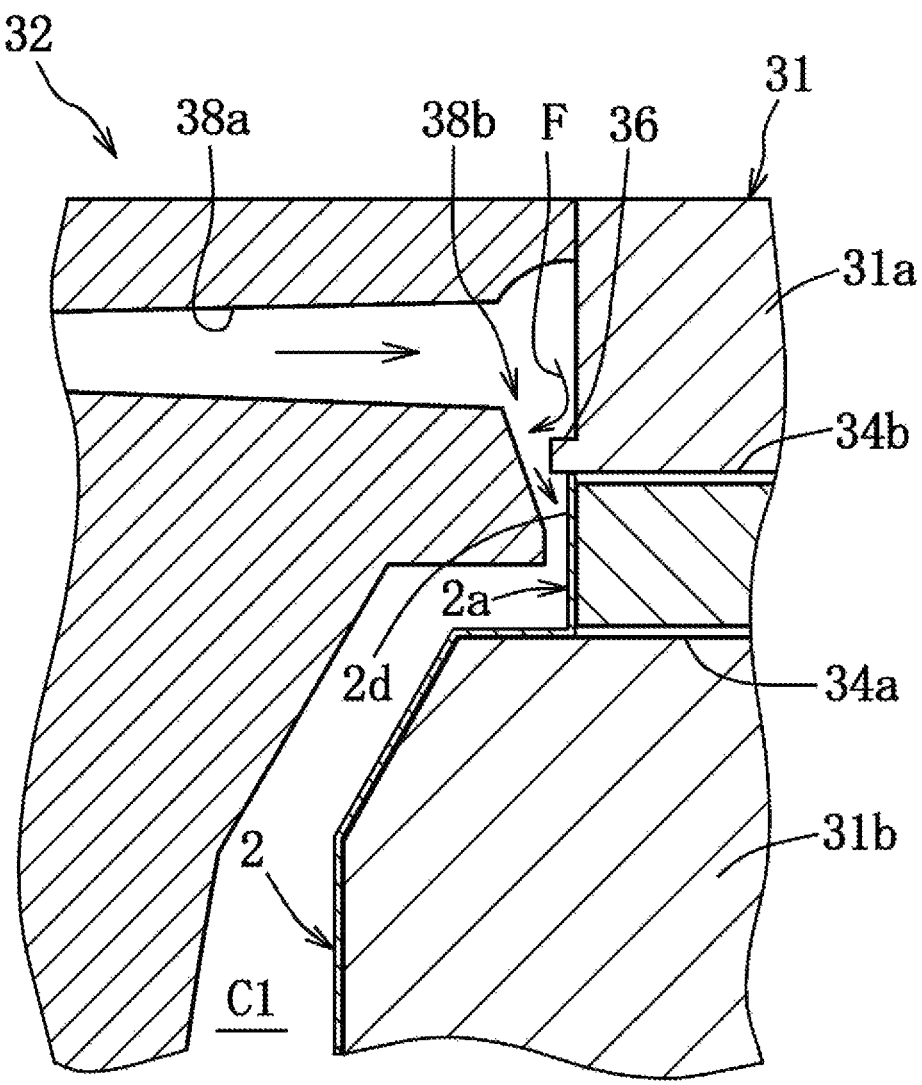
FIG. 11 is a vertical cross-sectional view of a side gate and surroundings.

The extension 2d has dimensions that allow a tip thereof to partially enter the runner 38b (see FIG. 11).

Next, the transparent resin layer forming step S2 will be described in greater detail.

Figure 8:
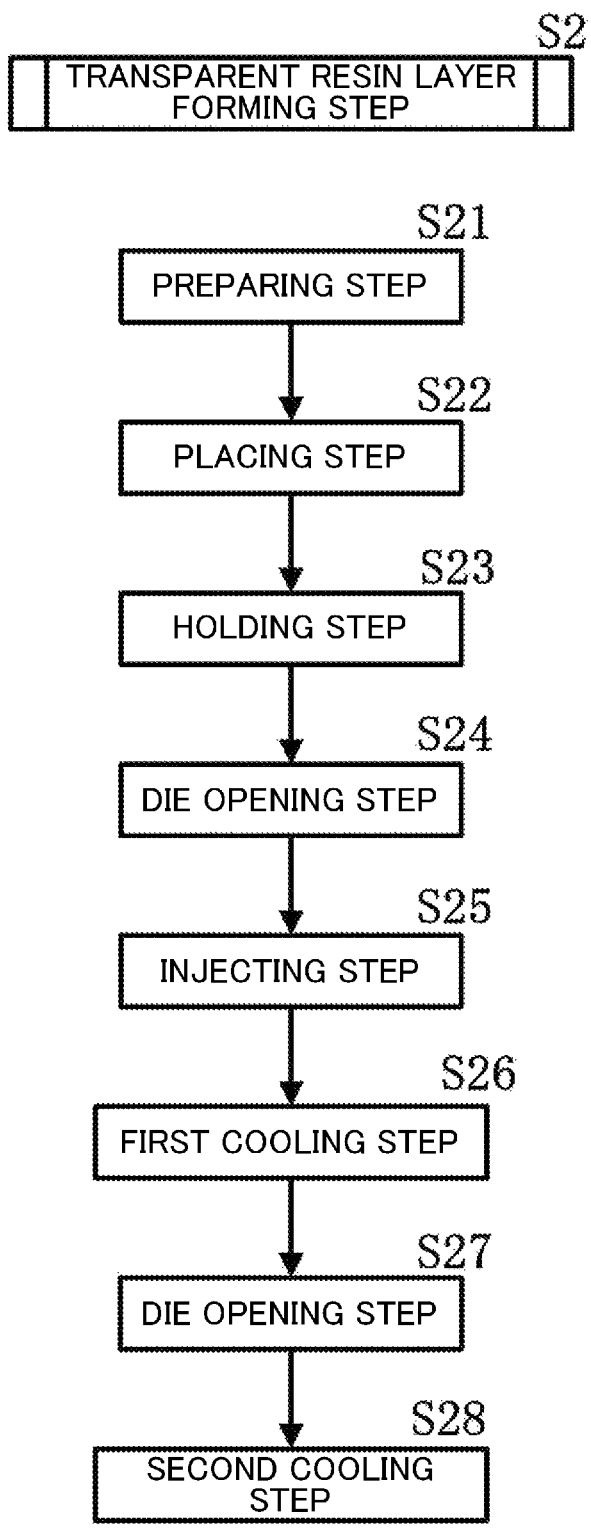
FIG. 8 is a flowchart of a transparent resin layer forming step.

As shown in FIG. 8, the transparent resin layer forming step S2 includes: a preparing step S21 of preparing the first and second dies 31 and 32; a placing step S22 of placing the first intermediate part 2 in the first die 31; a holding step S23 of positioning and holding the first intermediate part 2 with respect to the first die 31; a die closing step S24; an injecting step S25 of injecting the transparent resin material 12 in the molten state into a cavity C1 using an injection mechanism (not shown); a first cooling step S26 of cooling the transparent resin material 12 at a first cooling rate K1; a die opening step S27; and a second cooling step S28 of cooling the second intermediate part 6 at a second cooling rate K2; etc. Here, the first and second dies 31 and 32 are equivalent to a transparent resin layer forming unit.

In the preparing step S21, prepared are the first die 31, which is movable, and the second die 32, which forms the cavity C1 together with the first die 31 and is not movable.

The first die 31 is configured so that first die 31 can hold the first intermediate part 2 with the first intermediate part 2 being oriented substantially perpendicularly to the horizontal direction, and the temperature of the first die 31 can be adjusted.

As shown in FIGS. 9 and 10A-10D, the first die 31 includes a vacuum pump 33 (suction mechanism) that allows the first die 31 to stick to the first intermediate part 2 by vacuum suction, a body 31a, and an insert die 31b that can be inserted into a hollow portion of the body 31a, etc.

The insert die 31b has the same shape as that of the shape portion 5a as viewed above. A portion of the body 31a is previously placed in a half portion on one side of the insert die 31b.

The body 31a and the insert die 31b form first suction passages 34a that are a separation clearance (a gap of about 0.05 mm) at portions corresponding to boundaries between the shape portion 5a and the background portion 5b.

Each first suction passage 34a has an annular continuous shape. A second suction passage 34b is formed at and near and downstream of a protruding portion 36 described below.

The first die 31 includes a movable portion 31c, a plurality of grooves 34c for transmitting suction force of the vacuum pump 33 to the first and second suction passages 34a and 34b, a distributing portion 35 for distributing uniform suction force to the plurality of grooves 34c, a protruding portion 36 formed at a position corresponding to an upstream portion of the runner 38b of the body 31a, and a pair of locating pins 37 (positioning mechanism), etc.

The movable portion 31c is provided at an outer peripheral portion facing the second die 32, excluding a position corresponding to the runner 38b of the body 31a, and is disposed slightly (e.g., about 1.3 mm) away from the body 31a with a force being applied in the direction of the second die 32. The applied force and the separation distance are set such that when the movable portion 31c abuts the second die 32 due to the applied force, air can be discharged from the cavity C1 in the injecting step S25.

In the injecting step S25, the forward movement of the first die 31 is adjusted such that when the filling ratio of the transparent resin material 12 in the cavity C1 reaches a predetermined value (e.g., 80%), the movable portion 31c is closest to the body 31a.

As shown in FIGS. 10A-10D, the plurality of grooves 34c are each formed, corresponding to an end portion of the corresponding one of the first and second suction passages 34a and 34b.

The first and second suction passages 34a and 34b are in communication with the vacuum pump 33 through the distributing portion 35. The distributing portion 35 is disposed on an opposite side of the insert die 31b from the second die 32 (on the upstream side of the first and second suction passages 34a and 34b). The plurality of grooves 34c are linked in parallel to the distributing portion 35.

Figure 9:
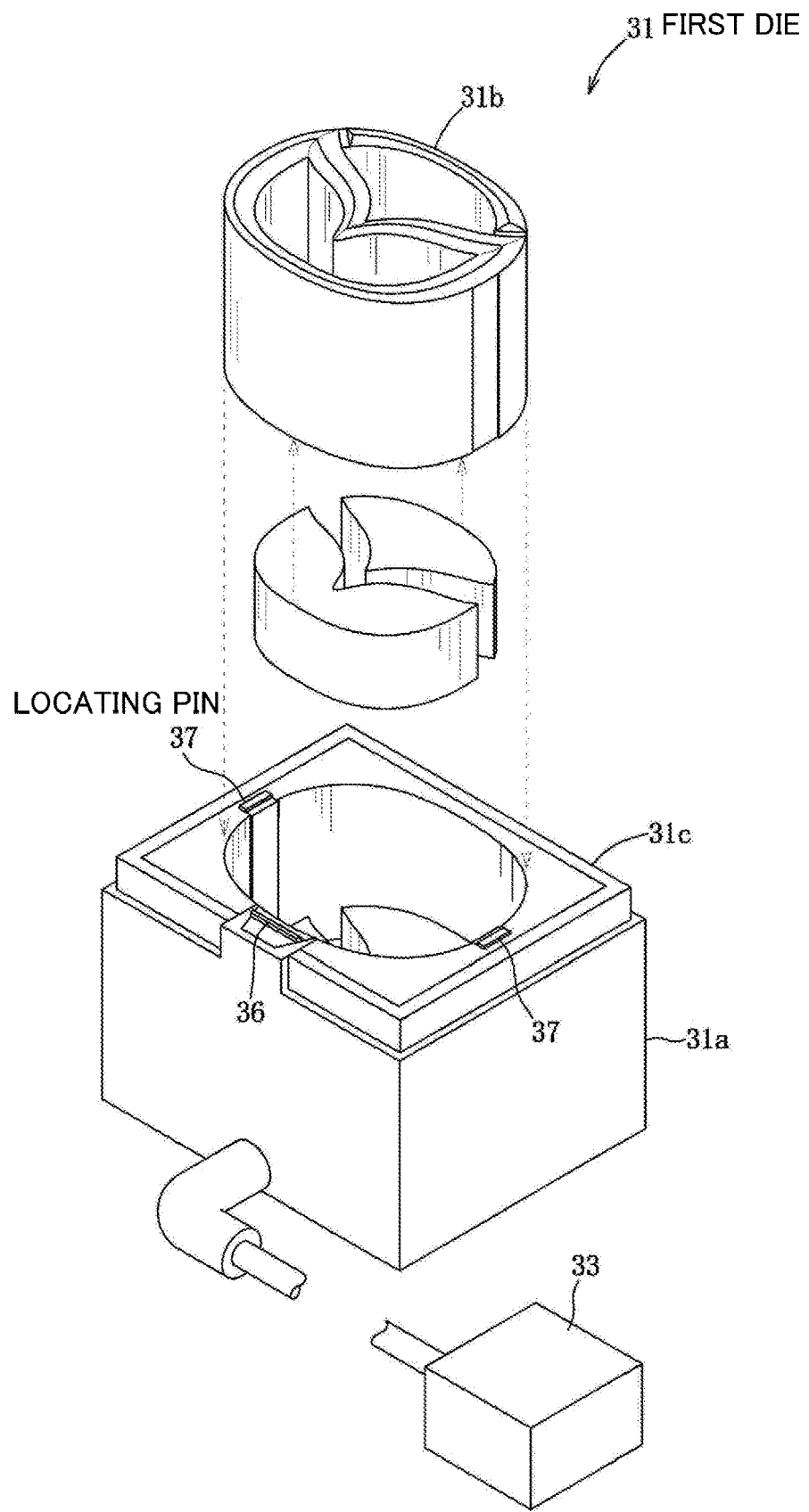
FIG. 9 is an exploded perspective view of the body of a first die and an insert die.

As shown in FIGS. 9 and 11, the protruding portion 36, which has a cubic shape, is formed at and near and upstream of the extension 2d of the first intermediate part 2, protruding perpendicularly from the body 31a toward the second die 32, and extending across the runner 38b from one side to the other side in the die surface direction.

The protruding portion 36, and a wall portion of the second die 32 forming the runner 38b, which faces the protruding portion 36, are equivalent to a flow direction changing unit for the transparent resin material 12.

The pair of locating pins 37 are configured to fit into the pair of recessed portions 2b, respectively, formed at both ends in the major axis length direction of the first intermediate part 2. The pair of locating pins 37 are each configured to move forward and backward from the body 31a in the direction of the second die 32, and have a function of ejecting the second intermediate part 6 by engaging with a reception surface portion 3a of the transparent resin layer 3.

As shown in FIGS. 10A-10D, the second die 32 is configured so that the second intermediate part 6 can be molded with the second intermediate part 6 being oriented substantially perpendicularly to the horizontal direction, and the temperature of the second die 32 can be adjusted.

The second die 32 includes an injection mechanism, an introduction gate 38a that is in communication with the injection mechanism and the side gate through the runner 38b, and a wall portion that forms a portion of the runner 38b and faces the first die 31, etc. When the second die 32 and the first die 31 are closed, the first and second dies 31 and 32 together form the cavity C1 and the runner 38b, and a downstream end of the runner 38b forms the side gate.

As shown in FIG. 11, the introduction gate 38a has a diameter that becomes gradually greater toward the first die 31, and is configured so that when the dies are closed, a space having a predetermined volume is formed at a portion where the introduction gate 38a is linked to the runner 38b.

Figure 10A:
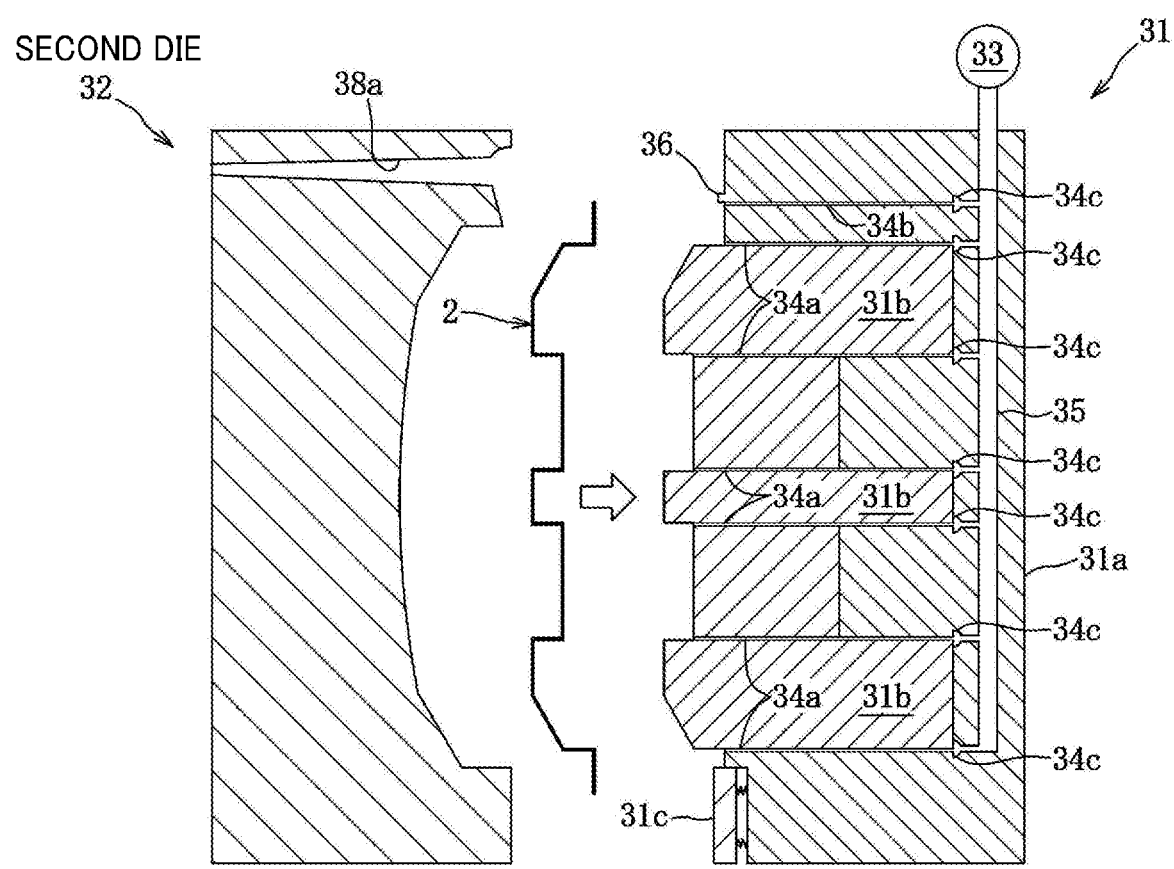
FIG. 10A is a vertical cross-sectional view of the first die and a second die in a first step of the transparent resin layer forming step.

As shown in FIG. 10A, the first intermediate part 2 is placed at a predetermined position of the first die 31 with the first and second dies 31 and 32 being separated from each other. In the placing step S22, the first intermediate part 2 is positioned by fitting the pair of locating pins 37 into the pair of recessed portions 2b, respectively, formed in the first intermediate part 2.

Figure 10B:
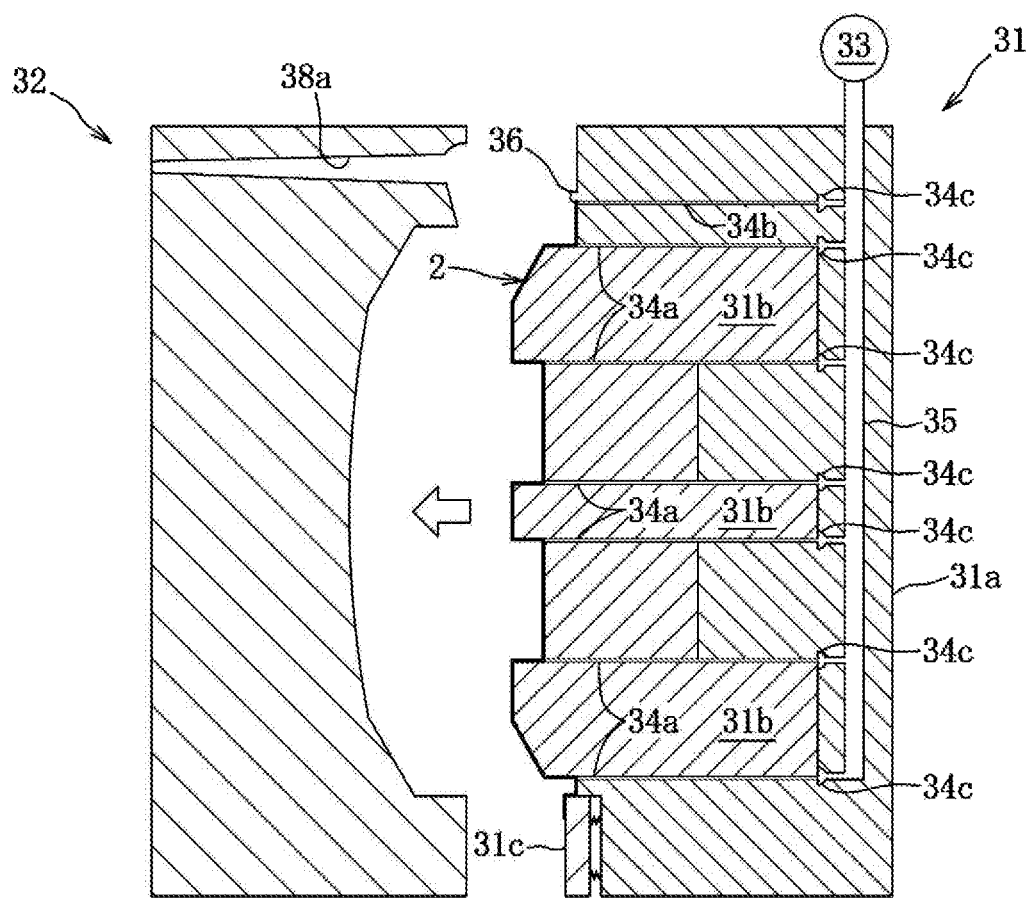
FIG. 10B is a vertical cross-sectional view of the first and second dies in a second step of the transparent resin layer forming step.

As shown in FIG. 10B, in the holding step S23, the first intermediate part 2 is attached to the first die 31 by suction through the first suction passages 34a corresponding to the boundaries between the shape portion 5a and the background portion 5b.

Because the suction is performed at the boundaries between the shape portion 5a and the background portion 5b, the ability to hold the first intermediate part 2 is improved while merchantable quality is maintained. In particular, in the case where the shape portion 5a has a raised and recessed pattern, the shape accuracy of the shape portion 5a can be increased by deliberately leaving a suction mark at the boundaries (ridges).

In addition, the first suction passages 34a each have an annular continuous shape corresponding to the shape portion 5a, and therefore, the entire first intermediate part 2 can be attracted and fixed by uniform suction force.

Figure 10C:
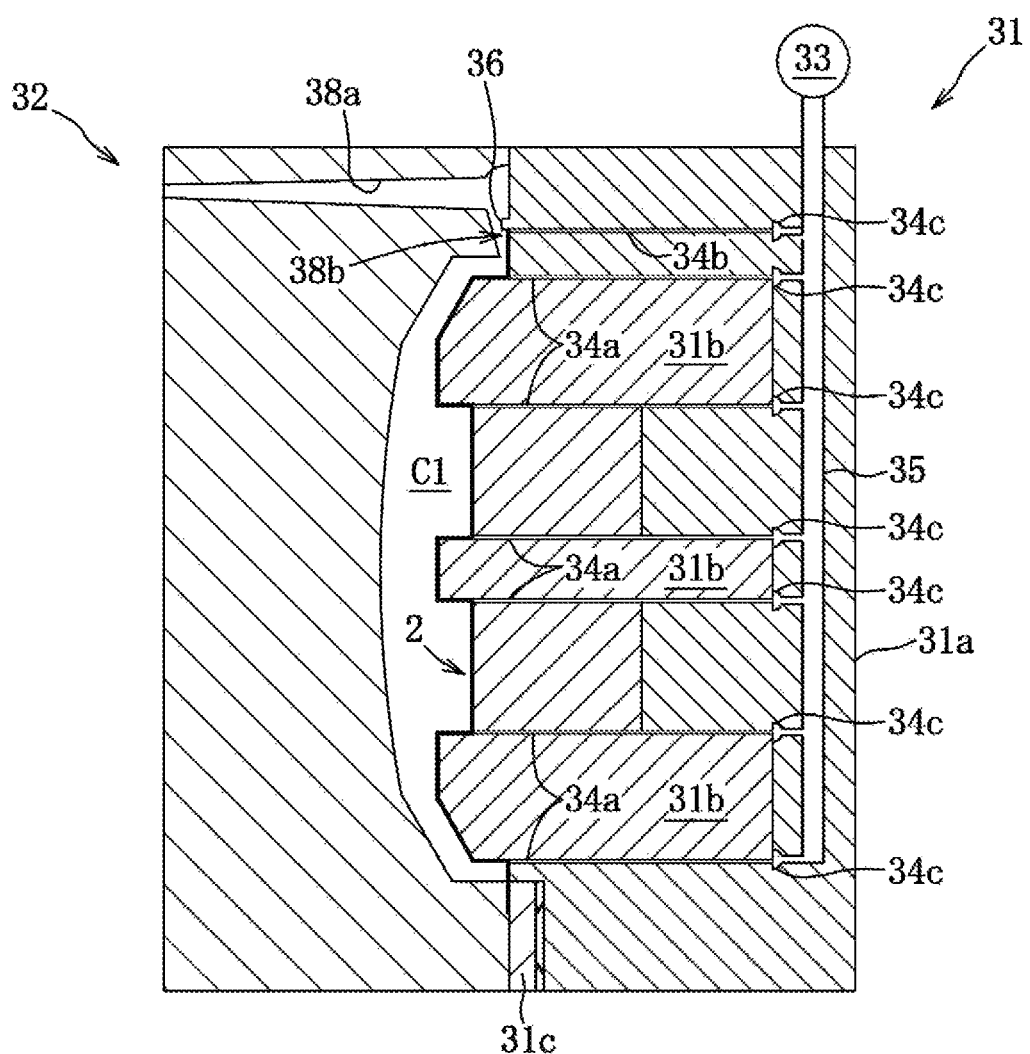
FIG. 10C is a vertical cross-sectional view of the first and second dies in a third step of the transparent resin layer forming step.

As shown in FIG. 10C, in the die closing step S24, the first die 31 approaches and moves to the second die 32, so that the die surfaces of the first and second dies 31 and 32 about each other to form the cavity C1.

The first intermediate part 2 positioned with respect to the body 31a is reliably held at a predetermined position because the edge 2a of the first intermediate part 2 extending along substantially the entire perimeter, excluding the extension 2d, is sandwiched by the first and second dies 31 and 32 when the first and second dies 31 and 32 are closed.

In this state, the movable portion 31c is separated from the body 31a by a predetermined force applied to the movable portion 31c.

Figure 10D:
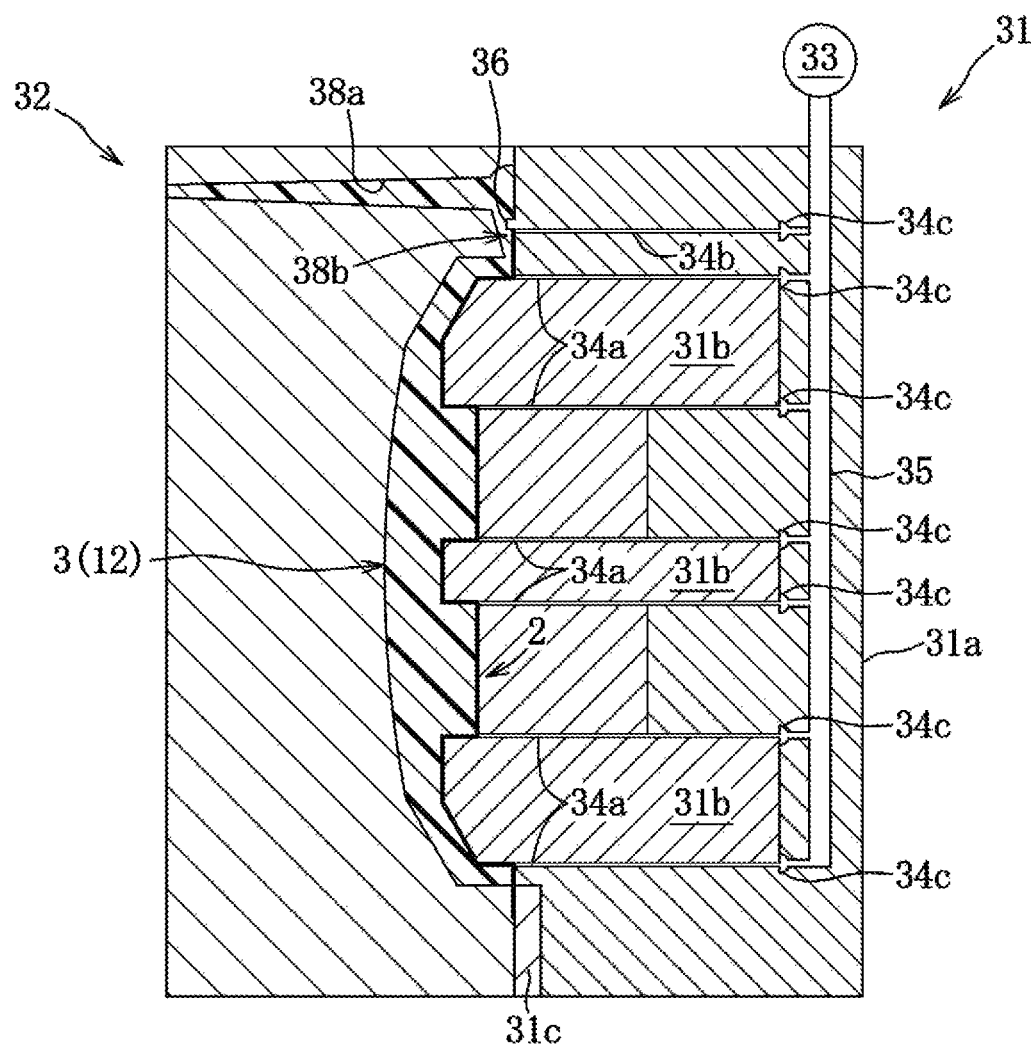
FIG. 10D is a vertical cross-sectional view of the first and second dies in a fourth step of the transparent resin layer forming step.

As shown in FIG. 10D, in the injecting step S25, the molten transparent resin material 12 heated to the injection temperature T1 is injected into the cavity C1. The molten transparent resin material 12 is injected from the injection mechanism, and supplied into the cavity C1 through the introduction gate 38a and the runner 38b.

As indicated by an arrow F in FIG. 11, the protruding portion 36 allows the transparent resin material 12 flowing through the runner 38b to change its flow direction to flow toward the wall portion of the second die 32 forming a portion of the runner 38b, which is opposite the protruding portion 36. Thereafter, the wall portion of the second die 32 forming a portion of the runner 38b changes the flow direction of the transparent resin material 12, which action presses the extension 2d of the first intermediate part 2 toward the first die 31. Thus, the suction force from the second suction passage 34b and the pressure from the transparent resin material 12 act on the extension 2d of the first intermediate part 2 in the direction of the first die 31.

While the filling ratio of the transparent resin material 12 in the cavity C1 is less than 80%, a contact pressure between the second die 32 and the movable portion 31c is adjusted to a predetermined value, so that air is discharged from the cavity C1 without the inflow of the transparent resin material 12 being blocked. As a result, air can be smoothly discharged from the cavity C1 while the transparent resin material 12 is being injected.

In the first cooling step S26, the transparent resin material 12 is cooled from the injection temperature T1 to the die temperature T2 at the first cooling rate K1. Thus, the transparent resin layer 3 is molded.

The transparent resin material 12 is an amorphous synthetic resin, and therefore, a relationship between the glass transition temperature Tg and the die temperature T2 that is determined, taking moldability into account, can be represented by Expression (1) below.

$$Tg-40 \leq T2 \leq Tg-20 \tag{1}$$

Therefore, in the case where the transparent resin material 12 is a polycarbonate, the injection temperature T1 and the die temperature T2 are within temperature ranges, 250° C.≤T1≤320° C. and 105° C.≤T2≤125° C. In this example, the injection temperature T1 is set to 300° C., and the die temperature T2 is set to 120° C.

Figure 12:
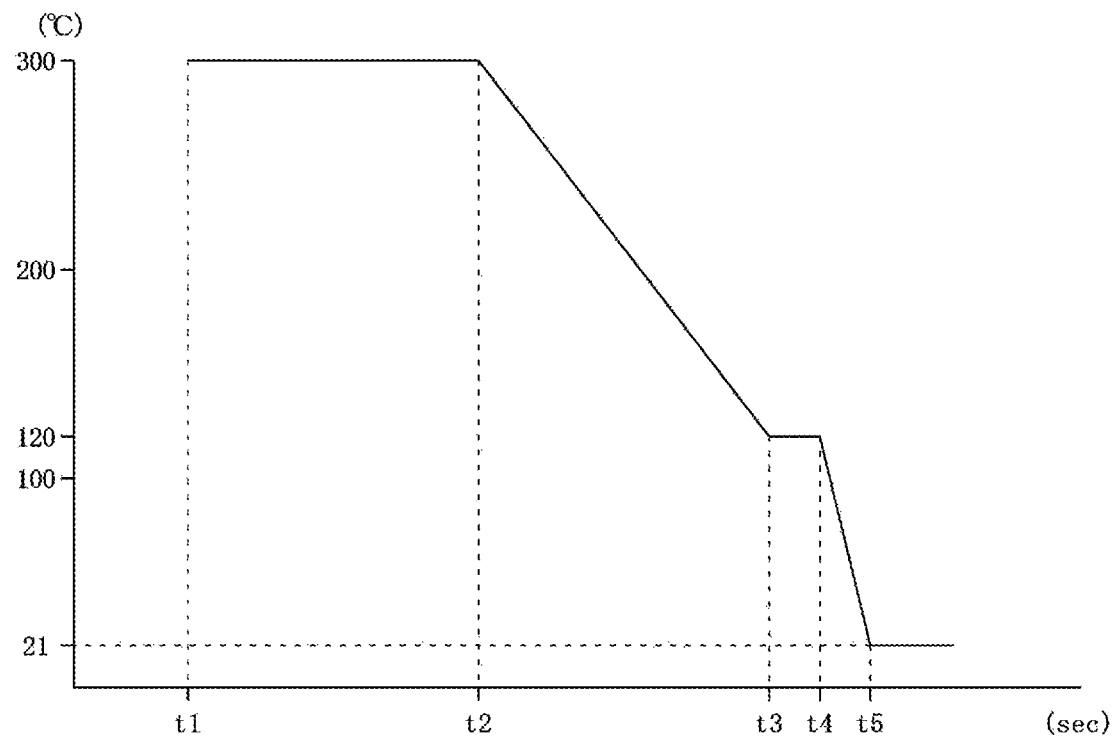
FIG. 12 is a time chart of resin temperature in the transparent resin layer forming step.

As shown in FIG. 12, the temperature of the transparent resin material 12 is maintained at the injection temperature T1 for a period of time from t1 to t2 that the molten transparent resin material 12 is supplied into the cavity C1 (the injecting step S25). The cooling of the transparent resin material 12 is started immediately after the end of the injecting step S25.

The first cooling rate K1 is set according to the following expression based on a relationship between the injection temperature T1, the die temperature T2, and a cooling time (t3−t2).

$$(T1-Tg+40)/(t3-t2) \leq K1 \leq (T1-Tg+20)/(t3-t2) \tag{2}$$

Note that the cooling time (t3−t2) is previously set, taking into account molding efficiency and moldability, for each type of the transparent resin material 12.

In addition, a pressure maintaining step is started simultaneously with the first cooling step S26.

In the pressure maintaining step, a pressure applied to the first intermediate part 2 and the transparent resin layer 3 is maintained in the cavity C1 for a predetermined period of time that is a portion of the duration of the first cooling step S26.

The die opening step S27 is performed for a period of time from t3 to t4. After the first die 31 is moved backward to be separated from the second die 32, the second intermediate part 6 is removed.

Figure 13A:
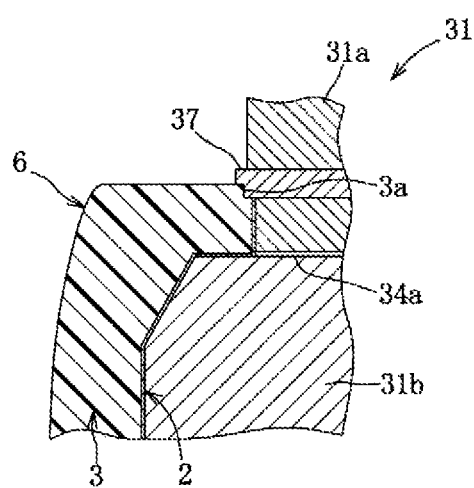
FIG. 13A is a vertical cross-sectional view of the body of the first die surrounding a locating pin before ejection.

As shown in FIGS. 2B and 13A, the transparent resin layer 3 of the second intermediate part 6 has rectangular reception surface portions 3a that are radially inwardly hollow, at positions corresponding to the recessed portions 2b. The rectangular reception surface portions 3a are formed such that the pair of locating pins 37 can be engaged with the respective reception surface portions 3a by the radially inner ends of the location pins 37 and the radially outer ends of the second intermediate part 6 being partially put on top of each other.

Figure 13B:
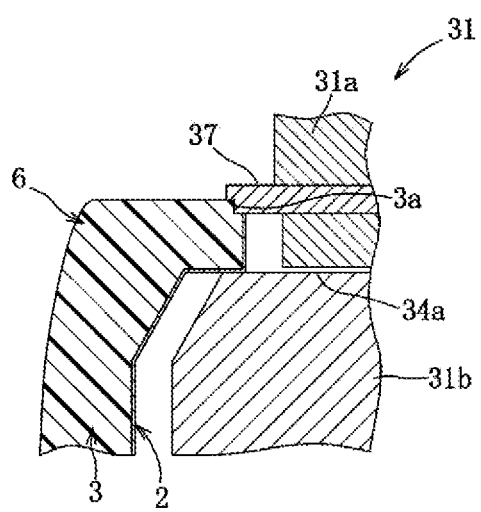
FIG. 13B is a vertical cross-sectional view of the body of the first die surrounding the locating pin during ejection.

Therefore, as shown in FIG. 13B, after the dies are opened, the second intermediate part 6 is removed from the first die 31 by a forward movement of the pair of locating pins 37.

Note that the reception surface portion 3a is not limited to an angular (rectangular) recessed portion, and may be a sloped recessed portion. In the case of a sloped recessed portion, a sudden change in the luminance of reflected light does not occur, and therefore, external appearance can be improved, resulting in an improvement in merchantable quality.

In the second cooling step S28, the second intermediate part 6 removed from the cavity C1 is cooled to room temperature (e.g., 20-30° C.) at the second cooling rate K2 that is higher than the first cooling rate K1.

As shown in FIG. 12, the cooling of the second intermediate part 6 removed from the first die 31 is started immediately after the end of the die opening step S27, and is performed for a period of time from t4 to t5.

This allows the first intermediate part 2, which has a higher shrinkage rate, and the transparent resin layer 3, which is integrated with the first intermediate part 2 and has a lower thermal shrinkage rate, to shrink to the same extent. Therefore, the occurrence of a space between the first intermediate part 2 and the transparent resin layer 3 due to detachment therebetween can be prevented or reduced.

If the second cooling rate K2 in the second cooling step S28 is 2° C./sec or more, the effect of increasing the shrinkage of the transparent resin layer 3 becomes manifest; and 4° C./sec or more, such an effect can be expected to be high.

The second intermediate part 6 is immersed into water at room temperature immediately after removal thereof from the first die 31.

A refrigerant for the second intermediate part 6 may be any one that allows the cooling rate to be controlled to a predetermined value. The second intermediate part 6 may be cooled using a mist of water or dry ice.

Next, the substrate resin layer forming step S3 will be described in greater detail.

Figure 14:
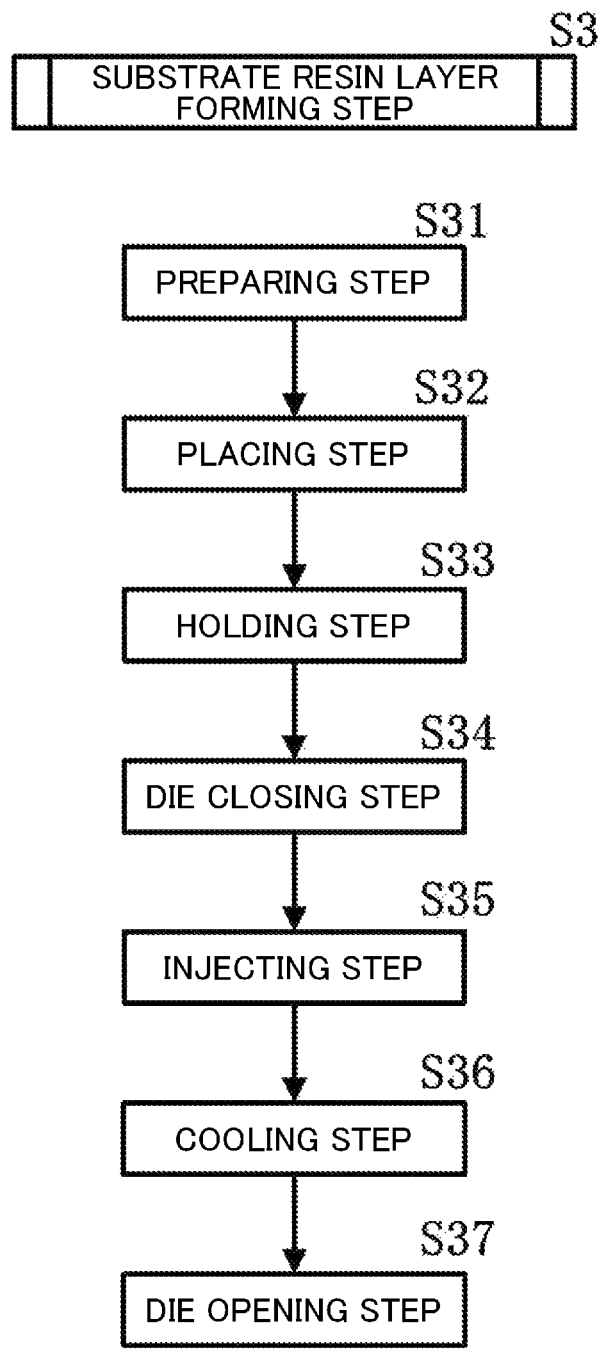
FIG. 14 is a flowchart of a substrate resin layer forming step.

As shown in FIG. 14, the substrate resin layer forming step S3 includes a preparing step S31 of preparing a first and a second die 41 and 42; a placing step S32 of placing the second intermediate part 6 on the first die 41; a holding step S33 of positioning and holding the second intermediate part 6 with respect to the first die 41; a die closing step S34; an injecting step S35 of injecting the substrate resin material 13 in the molten state into a cavity C2 using an injection mechanism (not shown); a cooling step S36 of cooling the substrate resin material 13; and a die opening step S37; etc. Here, the first and second dies 41 and 42 are equivalent to a substrate resin layer forming unit.

In the preparing step S31, prepared are the first die 41, which is not movable, and the second die 42, which forms the cavity C2 together with the first die 41 and is movable.

The first die 41 is configured so that first die 41 can hold the first intermediate part 2 with the first intermediate part 2 being oriented substantially perpendicularly to the horizontal direction, and the temperature of the first die 41 can be adjusted.

As shown in FIGS. 15A-15D, the first die 41 includes a pair of openings 41a, a vacuum pump 43 (suction mechanism) that allows the first die 41 to stick to the second intermediate part 6 by vacuum suction, a pair of suction passages 44 for transmitting suction force of the vacuum pump 43 to the pair of openings 41a, respectively, and a distributing portion 45 for distributing uniform suction force of the vacuum pump 43 to the passages, etc.

Note that, for the sake of convenience, FIGS. 15A-15D are horizontal cross-sectional views.

The pair of openings 41a are configured to stick to the transparent resin layer 3 of the second intermediate part 6 by suction, and are each in the shape of substantially a cup. The openings 41a are disposed at substantially symmetric positions corresponding to regions where a thickness between the front surface of the transparent resin layer 3 and the first intermediate part 2 is greater than an average thickness of the second intermediate part 6. In this example, the pair of openings 41a are disposed at positions corresponding to positions P (see FIG. 7) in the background portion 5b that are located on both sides in the major axis length direction of the center of the second intermediate part 6.

The pair of openings 41a are in communication with the vacuum pump 43 through the pair of suction passages 44, respectively, and the distributing portion 45. One end of the distributing portion 45 is connected to the vacuum pump 43. Upstream ends of the pair of suction passages 44 are connected in parallel to the other end of the distributing portion 45.

As shown in FIGS. 15A-15D, the second die 42 is configured so that the second intermediate part 6 can be molded with the second intermediate part 6 being oriented substantially perpendicularly to the horizontal direction, and the temperature of the second die 42 can be adjusted.

The second die 42 includes an injection mechanism (not shown), an introduction gate 48a that is in communication with the injection mechanism and the cavity 2, etc. When the second die 42 and the first die 41 are closed, the first and second dies 41 and 42 together form the cavity C2.

The shape of the cavity C2 is configured so that a final insert-molded article will have substantially a uniform thickness, and the substrate resin layer 4 will be formed to cover a surface of a radially outer end of the edge 2a of the first intermediate part 2, and the reception surface portion 3a.

The introduction gate 48 is formed, corresponding to a center of the cavity C2, and is configured to have a diameter that becomes gradually greater toward the first die 41.

Figure 15A:
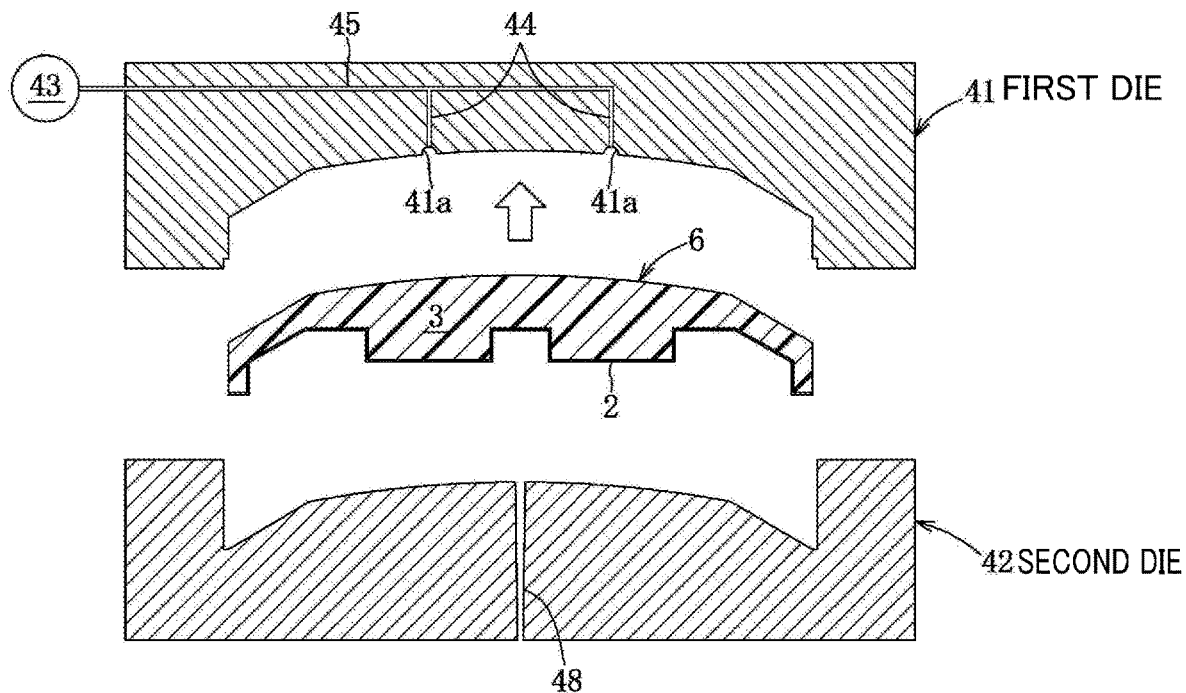
FIG. 15A is a horizontal cross-sectional view of a first and a second die in a first step of the substrate resin layer forming step.

As shown in FIG. 15A, the second intermediate part 6 is placed at a predetermined position of the first die 41 with the first and second dies 41 and 42 being separated from each other.

In the placing step S32, the second intermediate part 6 is positioned so that the regions corresponding to the background portion 5b (corresponding to the positions P) on both sides in the major axis length direction of the transparent resin layer 3 abut the pair of openings 41a.

Figure 15B:
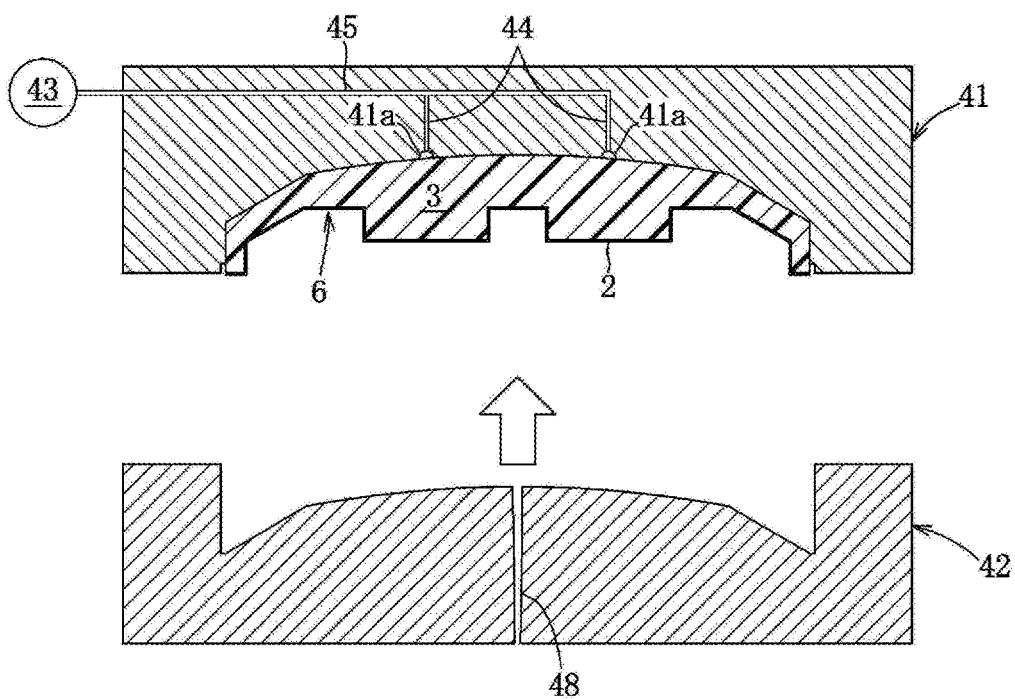
FIG. 15B is a horizontal cross-sectional view of the first and second dies in a second step of the substrate resin layer forming step.

As shown in FIG. 15B, in the holding step S33, the second intermediate part 6 is attracted toward the first die 41 by suction through the pair of openings 41a. The second intermediate part 6 is held at three positions that are substantially equally spaced in the major axis length direction, and therefore, the ability to hold the second intermediate part 6 by uniform suction force can be enhanced.

Figure 15C:
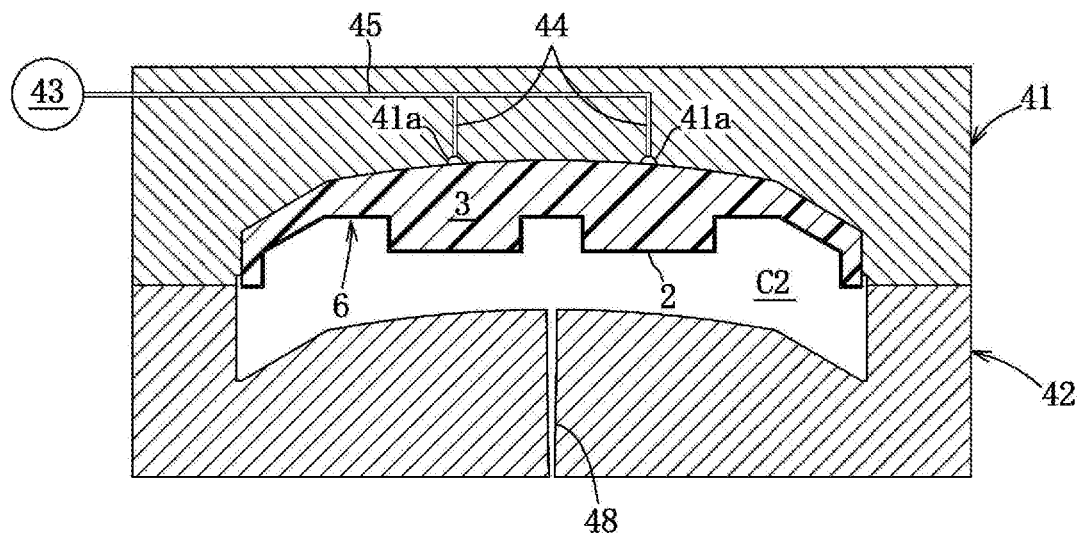
FIG. 15C is a horizontal cross-sectional view of the first and second dies in a third step of the substrate resin layer forming step.

As shown in FIG. 15C, in the die closing step S34, the second die 42 approaches and moves to the first die 41, so that the first and second dies 41 and 42 about each other to form the cavity C2.

Figure 15D:
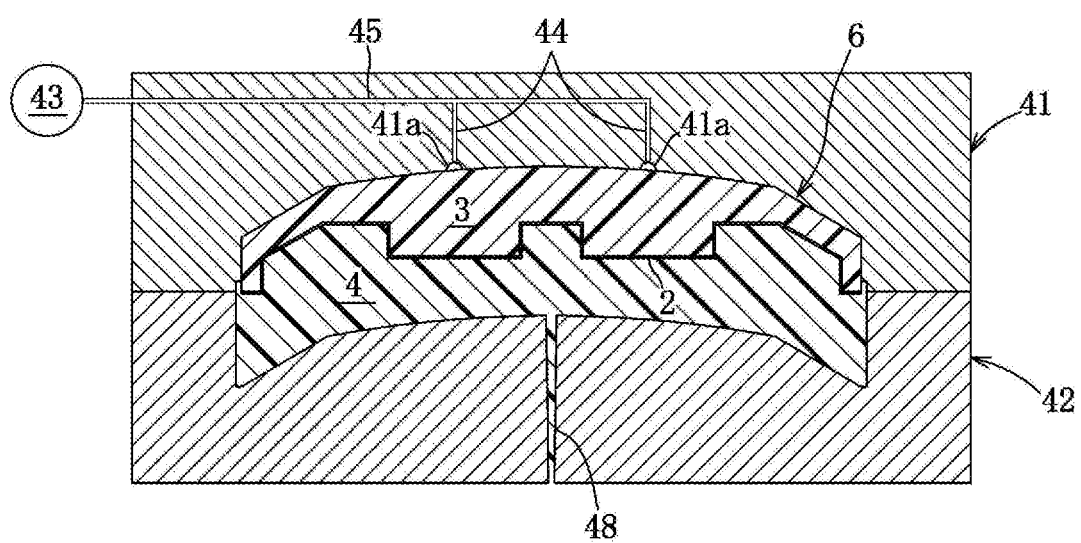
FIG. 15D is a horizontal cross-sectional view of the first and second dies in a fourth step of the substrate resin layer forming step.

As shown in FIG. 15D, the molten transparent resin material 13 heated to an injection temperature T3 is injected into the cavity C2. The molten transparent resin material 13 is injected from the injection mechanism, and supplied into the cavity C2 through the introduction gate 48.

In the case where the substrate resin material 13 is an ABS, the injection temperature (melting point) T3 is 180-270° C., which is higher than the glass transition temperature Tg of polycarbonates. Therefore, a suction mark is likely to be left due to softening of the transparent resin layer 3. However, the second intermediate part 6 is held at portions (regions corresponding to the positions P) that are least affected by the heat of the molten substrate resin material 13, and therefore, the occurrence of a suction mark is avoided. In addition, the plurality of radially extending cuts 2c are formed in the edge 2a of the first intermediate part 2, and therefore, wrinkles can be prevented or reduced, and the molten substrate resin material 13 is allowed to more easily flow around to the side facing the front surface of the edge 2a.

In the cooling step S36, the substrate resin material 13 is cooled from the injection temperature T3 to the die temperature T4 at a constant cooling rate. By solidifying the molten substrate resin material 13, the substrate resin layer 4 is molded. In the case where the substrate resin material 13 is an ABS, the die temperature T4 is set within the range of 40-80° C.

The cooling rate in the cooling step S36 is set based on a relationship between the injection temperature T3, the die temperature T4, and the cooling time. The cooling time is previously set, taking into account molding efficiency and moldability, for each type of the substrate resin material 13.

In addition, a pressure maintaining step is started simultaneously with the cooling step S36.

In the pressure maintaining step, a pressure applied to the second intermediate part 6 and the substrate resin layer 4 is maintained in the cavity C2 for a predetermined period of time that is a portion of the duration of the cooling step S36.

In the die opening step S37, the second die 42 is moved backward to be separated from the first die 41, and thereafter, the emblem 1 as a final product is removed using an ejection mechanism (not shown), and the front surface of the transparent resin layer 3 is subjected to a hard coating treatment.

Next, advantages and features of the film material insert molding method and device of this example will be described.

The insert molding method of this example includes the intermediate part forming step S1 of forming the first intermediate part 2 including the edge 2a that is disposed at and near an outer peripheral end of a final shape of the film material 11, extending radially outward, and the transparent resin layer forming step S2 of forming the second intermediate part 6 including the transparent resin layer 3, by injection molding, on the front surface of the first intermediate part 2 with the edge 2a being fixed to the first and second dies 31 and 32. Therefore, in the transparent resin layer forming step S2, the edge 2a of the first intermediate part 2 can be fixed to the first and second dies 31 and 32, and therefore, the film material 11 can be prevented from being displaced due to a flow pressure of the molten transparent resin material 12 flowing through the runner 38b including the side gate, and therefore, wrinkles are prevented from occurring in the film material 11.

The insert molding method of this example includes the substrate resin layer forming step S3 of forming the emblem 1 including the substrate resin layer 4 covering a surface of the radially outer end of the edge 2a, by injection molding, on the back surface of the second intermediate part 6.

Therefore, an end of the film material 11 can be prevented from being exposed from the external peripheral side surface of the emblem 1 as a final product, and thereby prevented from being visually noticeable.

In the intermediate part forming step S1, the pair of recessed portions 2b that are radially inwardly hollow are formed in the edge 2a. In the transparent resin layer forming step S2, the first intermediate part 2 is positioned using the pair of recessed portions 2b. Therefore, the accuracy of positioning the first intermediate part 2 in the transparent resin layer forming step S2 can be improved.

In the transparent resin layer forming step S2, formed are the reception surface portions 3a that are used together with the locating pins 37 to position the first intermediate part 2, and are radially inwardly hollow and located at positions of the transparent resin layer 3 corresponding to the locating pins 37. In the substrate resin layer forming step S3, the substrate resin layer 4 is formed, covering the reception surface portions 3a. The accuracy of positioning the first intermediate part 2 and the improvement of external appearance can be simultaneously achieved.

In the intermediate part forming step S1, the plurality of radially extending cuts 2c are formed in the edge 2a. Therefore, even if the edge 2a is elongated in order to enhance the fixation of the first intermediate part 2 by the first and second dies 31 and 32, the occurrence of wrinkles in the first intermediate part 2 can be prevented or reduced.

In the intermediate part forming step S1, a raised and recessed pattern is formed in the design portion 5. In the substrate resin layer forming step S3, the substrate resin layer 4 is formed such that the emblem 1 has a uniform thickness. The transmission of radio waves can be ensured while impression of depth is provided.

The insert molding device of this example is for forming the transparent resin layer 3 on the front surface of the film material 11 having the design portion 5, and the substrate resin layer 4 on the back surface of the film material 11, and includes: the first and second dies 31 and 32 for forming the second intermediate part 6 including the edge 2a that is formed at and near an outer peripheral end of a final shape of the film material 11, extending radially outward, and the transparent resin layer 3 obtained by injection molding on the front surface of the first intermediate part 2 with the edge 2a being fixed; and the first and second dies 41 and 42 for forming the emblem 1 including the substrate resin layer 4 covering a surface of a radially outer end of the edge 2a, by injection molding, on the back surface of the second intermediate part 6.

According to this configuration, the insert molding device of this example has the first and second dies 31 and 32 for forming the second intermediate part 6 including the edge 2a that is formed at and near an outer peripheral end of a final shape of the film material 11, extending radially outward, and the transparent resin layer 3 obtained by injection molding on the front surface of the first intermediate part 2 with the edge 2a being fixed. Therefore, in the transparent resin layer forming step S2, the edge 2a of the film material 11 can be fixed. This prevents the film material 11 from being displaced due to a flow pressure of the molten transparent resin material 12 flowing through the side gate 38b, so that the occurrence of wrinkles in the film material 11 can be prevented. The insert molding device of this example also has the first and second dies 41 and 42 for forming the emblem 1 including the substrate resin layer 4 covering a surface of a radially outer end of the edge 2a, by injection molding, on the back surface of the second intermediate part 6. Therefore, an end of the film material 11 can be prevented from being exposed from the external peripheral side surface of the emblem 1 as a final product, and thereby prevented from being visually noticeable.

The first and second dies 31 and 32 include the pair of locating pins 37 for positioning the first intermediate part 2 using the pair of recessed portions 2b of the edge 2a that are radially inwardly hollow. Therefore, the accuracy of positioning the first intermediate part 2 in the transparent resin layer forming step S2 can be improved.

Next, variations that are obtained by partially modifying the above embodiment will be described.

1) In the above embodiment, an example design portion including a shape portion having a raised and recessed pattern has been described. Alternatively, an insert-molded article may be provided that has a structure having at least three layers, and in which the intermediate part layer is formed of a film material having a design portion, and the design portion has a shape portion and background portion that are distinguished from each other only in color. In this case, a color boundary between the shape portion and the background portion corresponds to a separation clearance between the die body and the insert die.

2) In the above embodiment, an example pair of recessed portions formed at both ends in the major axis length direction has been described. Positioning is performed in at least a lengthwise direction and a widthwise direction. Therefore, in the case of a rectangular shape, only one recessed portion may be provided. In the case where three or more recessed portions are provided, locating pins having a circular cross-section without an angular portion may be used.

3) In the above embodiment, an example emblem that is an exterior part for a vehicle has been described. The present invention may be applied to interior parts for vehicles or decorative parts for products other than vehicles.

In the foregoing example, the transparent resin layer is formed of a PC, the film material is formed of a specific material not containing a heavy metal, and the substrate resin layer is formed of an ABS. These elements may be formed of any materials that satisfy at least design conditions.

4) In addition, it will be understood by those skilled in the art that various changes and modifications can be made to the embodiments without departing the scope of the present invention. Parts of the embodiments may be combined to obtain other new embodiments, which are also within the scope of the present invention.

DESCRIPTION OF REFERENCE CHARACTERS

1 EMBLEM
2 FIRST INTERMEDIATE PART
2A EDGE
2B RECESSED PORTION
2C CUT
3 TRANSPARENT RESIN LAYER
3A RECEPTION SURFACE PORTION
4 SUBSTRATE RESIN LAYER
5 DESIGN PORTION
11 FILM MATERIAL
31 FIRST DIE (FOR FORMING TRANSPARENT RESIN LAYER)
32 SECOND DIE (FOR FORMING TRANSPARENT RESIN LAYER)
37 LOCATING PIN
41 FIRST DIE (FOR FORMING SUBSTRATE RESIN LAYER)

42 SECOND DIE (FOR FORMING SUBSTRATE RESIN LAYER)
S1 INTERMEDIATE PART FORMING STEP
S2 TRANSPARENT RESIN LAYER FORMING STEP
S3 SUBSTRATE RESIN LAYER FORMING STEP

The invention claimed is:

1. A film material insert molding method for forming a transparent resin layer on a front surface of a film material having a design portion and a substrate resin layer on a back surface of the film material, the method comprising:
    an intermediate part forming step of forming a first intermediate part having an edge extending radially outward, the edge being disposed at the inside of an outer peripheral end of a final shape of the film material;
    a transparent resin layer forming step of forming a second intermediate part including a transparent resin layer, by injection molding, on a front surface of the first intermediate part, with the edge of the first intermediate part being fixed to a transparent resin layer forming unit; and
    a substrate resin layer forming step of forming an insert-molded article including a substrate resin layer, by injection molding, the substrate resin layer covering a back surface of the second intermediate part and a surface of a radially outer end of the edge, so that an end of the film material is prevented from being exposed from an external peripheral side surface of the insert-molded article as a final product.

2. The film material insert molding method of claim 1, wherein
    the intermediate part forming step includes forming one or more recessed portions that are radially inwardly hollow, in the edge, and
    the transparent resin layer forming step includes positioning the first intermediate part using the one or more recessed portions.

3. The film material insert molding method of claim 2, wherein
    the transparent resin layer forming step includes forming a reception surface portion that allows a locating pin to position the first intermediate part and is radially inwardly hollow and located at a position of the transparent resin layer corresponding to the locating pin, and
    the substrate resin layer forming step including forming the substrate resin layer such that the substrate resin layer covers the reception surface portion.

4. The film material insert molding method of claim 3, wherein
    the intermediate part forming step includes forming a plurality of radially extending cuts in the edge.

5. The film material insert molding method of claim 4, wherein
    the intermediate part forming step including forming a protruding and recessed pattern in the design portion, and
    the substrate resin layer forming step includes forming the substrate resin layer such that the insert-molded article has a uniform thickness.

6. The film material insert molding method of claim 3, wherein
    the intermediate part forming step including forming a protruding and recessed pattern in the design portion, and
    the substrate resin layer forming step includes forming the substrate resin layer such that the insert-molded article has a uniform thickness.

7. The film material insert molding method of claim 2, wherein
    the intermediate part forming step includes forming a plurality of radially extending cuts in the edge.

8. The film material insert molding method of claim 7, wherein
    the intermediate part forming step including forming a protruding and recessed pattern in the design portion, and
    the substrate resin layer forming step includes forming the substrate resin layer such that the insert-molded article has a uniform thickness.

9. The film material insert molding method of claim 2, wherein
    the intermediate part forming step including forming a protruding and recessed pattern in the design portion, and
    the substrate resin layer forming step includes forming the substrate resin layer such that the insert-molded article has a uniform thickness.

10. The film material insert molding method of claim 1, wherein
    the transparent resin layer forming step includes forming a reception surface portion that allows a locating pin to position the first intermediate part and is radially inwardly hollow and located at a position of the transparent resin layer corresponding to the locating pin, and
    the substrate resin layer forming step including forming the substrate resin layer such that the substrate resin layer covers the reception surface portion.

11. The film material insert molding method of claim 10, wherein
    the intermediate part forming step includes forming a plurality of radially extending cuts in the edge.

12. The film material insert molding method of claim 11, wherein
    the intermediate part forming step including forming a protruding and recessed pattern in the design portion, and
    the substrate resin layer forming step includes forming the substrate resin layer such that the insert-molded article has a uniform thickness.

13. The film material insert molding method of claim 10, wherein
    the intermediate part forming step including forming a protruding and recessed pattern in the design portion, and
    the substrate resin layer forming step includes forming the substrate resin layer such that the insert-molded article has a uniform thickness.

14. The film material insert molding method of claim 1, wherein
    the intermediate part forming step includes forming a plurality of radially extending cuts in the edge.

15. The film material insert molding method of claim 14, wherein
    the intermediate part forming step including forming a protruding and recessed pattern in the design portion, and
    the substrate resin layer forming step includes forming the substrate resin layer such that the insert-molded article has a uniform thickness.

16. The film material insert molding method of claim 1, wherein
    the intermediate part forming step including forming a protruding and recessed pattern in the design portion, and the substrate resin layer forming step includes forming the substrate resin layer such that the insert-molded article has a uniform thickness.

\* \* \* \* \*